(12) United States Patent
Yahkind et al.

(10) Patent No.: US 6,624,277 B2
(45) Date of Patent: Sep. 23, 2003

(54) POLYURETHANE POLYOL COMPOSITIONS AND COATING COMPOSITIONS COMPRISING THE SAME

(75) Inventors: Alexander Leo Yahkind, West Bloomfield, MI (US); Robert Brian Feisel, Southfield, MI (US); Michael Todd Render, Waterford, MI (US); Dhruv Vrajlal Parekh, Troy, MI (US)

(73) Assignee: AKZO Nobel N.V., Arnhem (NL)

(*) Notice: Subject to any disclaimer, the term of this patent is extended or adjusted under 35 U.S.C. 154(b) by 132 days.

(21) Appl. No.: 10/015,318

(22) Filed: Dec. 12, 2001

(65) Prior Publication Data

US 2002/0123545 A1 Sep. 5, 2002

Related U.S. Application Data

(60) Provisional application No. 60/257,471, filed on Dec. 22, 2000.

(30) Foreign Application Priority Data

Feb. 28, 2001 (EP) .............................................. 01200734

(51) Int. Cl.$^7$ ........................ C08G 18/64; C08G 18/80; C08L 75/12; C09D 175/12; C07C 271/08
(52) U.S. Cl. .................... 528/45; 252/182.26; 525/509; 528/49; 528/59; 528/65; 528/85; 560/25; 560/26; 560/115; 560/158
(58) Field of Search ................... 252/182.26; 525/509; 528/45, 49, 59, 65, 85; 560/25, 26, 115, 158

(56) References Cited

U.S. PATENT DOCUMENTS

| | | | |
|---|---|---|---|
| 4,007,151 A | 2/1977 | Ogawa et al. ................. 528/49 |
| 4,235,766 A | 11/1980 | Kuijper ....................... 427/420 |
| 4,394,491 A | 7/1983 | Hoffman ...................... 525/452 |
| 4,444,975 A | 4/1984 | Pokorny ....................... 528/49 |
| 4,855,490 A | 8/1989 | Markusch et al. ........... 560/355 |
| 5,278,223 A | 1/1994 | Gruenewaelder et al. ... 524/502 |
| 5,286,782 A | 2/1994 | Lamb et al. ................. 524/507 |
| 5,741,880 A | 4/1998 | Valpey, III et al. ........... 528/74 |
| 5,759,631 A | 6/1998 | Rink et al. ................ 427/407.1 |

FOREIGN PATENT DOCUMENTS

| | | |
|---|---|---|
| BE | 837 629 | 7/1976 |
| DE | 44 06 211 | 8/1995 |
| EP | 219 131 A2 | 4/1987 |
| EP | 645 411 B1 | 3/1995 |
| EP | 713 863 B1 | 5/1996 |
| EP | 905 157 A1 | 3/1999 |
| EP | 936 257 A1 | 8/1999 |
| FR | 1 541 410 | 10/1967 |
| GB | 1113925 | 5/1968 |
| GB | 1 520 940 | 8/1978 |
| JP | 5 1070-227 | 6/1976 |
| WO | WO 96/40813 | 12/1996 |

OTHER PUBLICATIONS

Derwent Abstract 59666X/32 (1976) abstracting BE 837 629.
Derwent Abstract 20, 125Q (1966) abstracting FR 1 541 410.
Derwent Abstract 58782X/31 (1976) abstracting JP 5 1070–227.
Derwent Abstract 95–303108/40 (1995) abstracting DE 44 06 211.
"Isofol®Alcohols and Isofol®Derivatives Defined Branched Alcohols for Multiple Applications," CONDEA, p.p. 1–41.

*Primary Examiner*—Rabon Sergent
(74) *Attorney, Agent, or Firm*—David H. Vickrey

(57) ABSTRACT

The present invention relates to polyurethane polyol compositions comprising the reaction product of a polyisocyanate, a polyol, and a Guerbet alcohol having at least 12 carbon atoms or a Guerbet alcohol mixture having an average of at least 12 carbon atoms. Preferred polyols are $\alpha,\beta$ diols and $\alpha,\gamma$ diols. The polyurethane polyol compositions exhibit very low viscosity and are particularly useful in very low VOC coating compositions. The resulting cured coating provides surprisingly improved properties.

20 Claims, No Drawings

POLYURETHANE POLYOL COMPOSITIONS AND COATING COMPOSITIONS COMPRISING THE SAME

This application claims priority of U.S. Ser. No 60/257,471 filed on Dec. 22, 2000 and European Patent Application Serial No. 01200734, filed on Feb. 28, 2001.

This invention relates to polyurethane polyol compositions comprising the reaction product of a polyisocyanate, a polyol, and a Guerbet alcohol having at least 12 carbon atoms, and to coating compositions comprising such polyurethane polyol compositions.

BACKGROUND OF THE INVENTION

Polyurethane polyol compositions comprising the reaction product of a polyisocyanate, a polyol, and a monofunctional alcohol are generally known, e.g., from patent publication WO 96/40813. This publication discloses in general terms that the monofunctional alcohol can be linear or branched, cyclic or acyclic, and that the alcohols and thiols can be primary, secondary or tertiary.

It is known to use polyurethane polyol compositions as part of coating compositions and in multi-component coating systems. Such coating compositions and multi-component coating systems also comprise a crosslinker.

It has been found that polyurethane polyol compositions prepared using Guerbet alcohols having at least 12 carbon atoms result in polyurethane polyol compositions which, when used in coating compositions and multi-component coatings systems, produce a finished coating that has surprisingly improved properties as compared to traditional monoalcohol substitutions or branched monoalcohols having less than 12 carbon atoms. The finished coating shows better flexibility. Additionally, the uncured polyurethane polyol compositions have a lower VOC content and lower viscosity.

SUMMARY OF THE INVENTION

In one embodiment, the current invention is a polyurethane polyol composition comprising the reaction product of (a) polyisocyanate, (b) a polyol, and (c) a Guerbet alcohol having at least 12 carbon atoms or a Guerbet alcohol mixture having an average of at least 12 carbon atoms.

Another embodiment of the invention encompasses a method of making such polyurethane polyol compositions.

The invention is also directed to coating systems and coating compositions comprising such polyurethane polyol composition and a crosslinker.

DETAILED DESCRIPTION OF THE INVENTION

Polyisocyanates useful in the current invention typically have a functionality of 2 to 5. Due to variations in the preparation of such isocyanates, commercially available polyisocyanates may contain a mixture of functionalities. Such mixtures of polyisocyanates can be used in the current invention.

Non-limiting examples of polyisocyanates useful in the current invention are 1,6-hexamethylene diisocyanate, isophorone diisocyanate, tetramethylxylene diisocyanate, 2-methyl-1,5-pentane diisocyanate, 2,2,4-trimethyl-1,6-hexamethylene diisocyanate, 1,12-dodecane diisocyanate, methylene bis(4-cyclohexyl isocyanate), the biuret of 1,6-hexamethylene diisocyanate, the isocyanurate of 1,6-hexamethylene diisocyanate, the isocyanurate of isophorone diisocyanate, and the triisocyanate functional adduct of tetramethylxylylene diisocyanate and trimethylolpropane. The preferred polyisocyanate is the isocyanurate of hexamethylene diisocyanate (isocyanurate of HDI).

Non-limiting examples of polyols useful in the current invention are $\alpha,\beta$ and $\alpha,\gamma$ diols, for instance 2-ethyl-1,3-hexane diol, 1,2-hexane diol, 1,2-octane diol, 1,2-decane diol, 2,2,4-trimethyl-1,3 pentane diol, and 2-butyl-2-ethyl-2,3-propane diol.

Guerbet alcohols are branched, primary monofunctional alcohols that have two linear carbon chains with the branch point always at the second carbon position. Guerbet alcohols are chemically described as 2-alkyl-1-alkanols. The Guerbet alcohol used in the current invention is an alcohol having at least 12 carbon atoms or a Guerbet alcohol mixture having an average of at least 12 carbon atoms. The Guerbet alcohol preferably used in the current invention is one having at least 16 carbon atoms or a Guerbet alcohol mixture having an average of at least 16 carbon atoms. Preferably, the Guerbet alcohol used in the current invention is one having not more than 36 carbon atoms, more preferably not more than 32 carbon atoms. The most preferred Guerbet alcohols are 2-hexyl-1-decanol, 2-octyl-1-decanol, 2-octyl-1-dodecanol, 2-hexyl-1-dodecanol, 2-decyl-1-tetradecanol, and mixtures thereof. The Guerbet alcohols used according to the present invention may be represented by the following formula:

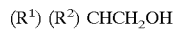

$(R^1)(R^2)CHCH_2OH$ wherein
$R^1$ is a linear alkyl group,
$R^2$ is a linear alkyl group,
the sum of the carbon atoms in $R^1$ and $R^2$ is 10 to 34, and both $R^1$ and $R^2$ are present.

Guerbet alcohols are commercially available from Sasol Chemie GmbH as Isofol® alcohols and from Cognis as Guerbetol.

The polyurethane polyol compositions of the current invention can be combined with crosslinkers to produce coating compositions. Any hydroxyl group-reactive crosslinker may be employed in the coating compositions and multi-component coating systems of the current invention, for non-limiting example, polyisocyanates, blocked polyisocyanates, urea, and melamine resins. Mixtures of such crosslinkers may also be used. Melamine crosslinkers are chosen for one-package coating systems and isocyanates are typically used in two component systems.

The coating composition can also comprise catalysts for the curing reaction between the hydroxyl groups in the polyurethane polyol composition and the hydroxyl-reactive group of the crosslinker. For non-limiting examples with isocyanates as crosslinkers, dibutyl tin dilaurate, triethyl amine, and metal catalysts and the like are preferred. Non-limiting examples for aminoplast crosslinkers include sulphonic acid catalysts like blocked dodecyl benzene sulfonic acid. The coating compositions can also contain pigments. Inorganic as well as organic pigments may be used. The composition can further comprise conventional additives, such as stabilizers, surfactants, fillers, UV-absorbers, and various additives and solvents.

The coating composition of the present invention can be applied to any substrate. The substrate may be, for example, metal, plastic, wood, glass, ceramic, or another coating layer. The other coating layer may be comprised of the coating composition of the current invention or it may be a different coating composition. The coating composition of the current invention shows particular utility as clear coats, base coats, and pigmented top coats. The coating compositions can be applied by conventional means such as by spray gun, brush or roller, spraying being preferred. Curing temperatures preferably are between 0 and 130° C. and more preferably between 20 and 120° C. The compositions are particularly suitable in the preparation of coated metal substrates, in particular transportation vehicles such as trains, trucks, buses, and airplanes.

Due to the flexibility of the resulting cured coating, the coating composition of the present invention is particularly useful for flexible plastic substrates and on articles that are a combination of plastic and other materials.

The invention is further illustrated by the following examples.

EXAMPLES

Comparative Example 1

A 2-liter, 4-neck round-bottomed flask equipped with a stirrer, a condenser, a heating mantel, a thermocouple, a Masterflex peristaltic pump, and a nitrogen inlet was charged with:

| | |
|---|---|
| 480.0 g | 2-butyl-2-ethyl propane diol, |
| 228.9 g | n-butyl acetate, |
| 0.5 g | 10% solution dibutyl tin dilaurate in n-butyl acetate. |

This mixture was heated to 70° C. under a nitrogen blanket. When the mixture reached 70° C., the following isocyanate solution was added over a 2-hour period using a Masterflex peristaltic pump:

| | |
|---|---|
| 588.0 g | Desmodur N-3300 (isocyanurate of HDI) and |
| 228.9 g | n-butyl acetate. |

After completion of the isocyanate addition, the reaction temperature was maintained at 70° C. for an additional 2 hours, at which point Fourier Transform Infrared Spectroscopy (FTIR) was used to determine that there was no residual isocyanate. The resulting solution of polyurethane polyol was a resin solution having a non-volatile content of 66.7% wt and a Brookfield viscosity of 1,420 cps.

Example 2

A 2-liter, 4-neck round-bottomed flask equipped with a stirrer, a condenser, a heating mantle, a thermocouple, a dropping funnel, and a nitrogen inlet was charged with:

| | |
|---|---|
| 588.0 g | Desmodur N-3300 (isocyanurate of HDI) |
| 234.45 g | n-butyl acetate, and |
| 0.5 g | 10% solution dibutyl tin dilaurate in n-butyl acetate |

The mixture was heated to 70° C. under a nitrogen blanket. When the mixture reached 70° C., 186.0 g 2-butyl-1-octanol (ISOFOL-12 from Sasol Chemie GmbH) were added through the dropping funnel over a one-hour period. During the addition, the reaction temperature was maintained between 70° C. and 75° C. After the addition, the resulting prepolymer was maintained at 70° C. for an additional hour.

A separate 3-liter, 4-neck round-bottomed flask equipped with a stirrer, a condenser, a heating mantle, a thermocouple, a Masterflex peristaltic pump, and a nitrogen inlet was charged with:

| | |
|---|---|
| 320.0 g | 2-butyl-2-ethyl propane diol and |
| 234.45 g | n-butyl acetate. |

This mixture was heated to 70° C., and then the prepolymer prepared above was added over a 2-hour period using a Masterflex peristaltic pump. The reaction temperature was maintained between 70° C. and 75° C. After completion of the prepolymer addition, the reaction temperature was maintained at 70° C. for an additional 2 hours, at which point it was determined by FTIR that there was no indication of residual isocyanate.

The properties of the resulting polyurethane polyol are reported in Table 2.

Examples 3 through 6

Comparative Examples 7 through 10

The polyurethane polyol compositions of Examples 3 through 6 and Comparative Examples 7 through 10 were prepared according to the procedure of Example 2 using the reactants and amounts indicated in Table 1. The total amount of n-butylacetate used in each Example is given in Table 1. In each Example, half the total amount is used to prepare the prepolymer and half is used to prepare the polyurethane polyol. All monoalcohol substitutions are at the same molar level. The properties of the resulting polyurethane polyol compositions are reported in Table 2.

Comparative Example 11

An acrylic polyol was prepared by conventional free radical polymerization typically used in the coatings industry. The properties of the resulting acrylic polyol are given in Table 2.

Coating Compositions

Clear coat coating compositions were prepared with melamine resin Cymel 303 commercially available from Cytec Industries and polyurethane polyol compositions of Comparative Examples 1, 7, 8, and 11 and Examples 2 through 6 according to the following formulation:

| | |
|---|---|
| 70.0 g | polyurethane polyol (based on resin solids) |
| 28.9 g | Cymel 303 (based on resin solids) |
| 1.0 g | blocked dodecyl benzene sulphonic acid (based on actives) |
| 0.1 g | Byk 310, silicone flow agent available from Byk Chemie (based on actives) |

Preparation of Test Panels and Coating Properties:

Using a #44 draw down bar, the clear coats were applied on 4"×12" (10.16 cm to 30.48 cm) Bonderite 1000 steel panels commercially available from ACT Laboratories and then baked at 121° C. for 30 minutes. The target dry film thickness was 1.0±0.1 mil (25.4±2.5 microns). After the bake, the following properties were tested on the panels:

Room Temperature Conical Mandrel Flexibility (¼" to 2" (0.635 cm to 5.08 cm) mandrel diameter): GM 9503P Reverse Impact (40 inch-pound): Chrysler LP-463PB-19-01

Further, acid etch testing was conducted as follows:

Using a #44 draw down bar the clear coats were applied on 3"×18" (7.62 cm×45.72 cm) black E-coated steel panels and then baked at 250 F. (121° C.) for 30 minutes. The target dry film thickness was 1.0±0.1 mil (25.4±2.5 microns). After the bake, the panels were placed on a gradient temperature bar ranging from 60° C. to 90° C. When the panels reached thermal equilibrium with the gradient bar, a 10% wt solution of aqueous sulphuric acid was spotted along the panel in 3° C. increments. The panels were exposed to the acid and temperature gradient for 30 minutes and then rinsed with distilled water. The temperature at which the first signs of etching are visible and the severity of etch at 77° C. are reported.

Table 3 summarizes these test results. It should also be noted that the clear coat formulations using the polyol of Comparative Examples 7 and 8 crystallized after sitting for 1 day.

One component, melamine cured clearcoat compositions based on Polyurethane Polyols Examples 2 and 3, were applied to the plastic substrate (TPO). Prior to the application of the clearcoat, TPO substrate was coated with an adhesion promoter and one component basecoat. Visual observations after bending of the coated substrate confirmed that these coating compositions on flexible substrates have surprising resistance to cracking.

TABLE 1

| Reactants | n-carbon in mono-functional alcohol | No mono-functional alcohol Comp. Ex. 1 (gms) | Guerbet alcohol modified (branched) | | | | | Linear alcohol modified | | | |
|---|---|---|---|---|---|---|---|---|---|---|---|
| | | | Ex. 2 (gms) | Ex. 3 (gms) | Ex. 4 (gms) | Ex.5 (gms) | Ex.6 (gms) | Comp Ex.7 (gms) | Comp Ex. 8 (gms) | Comp Ex. 9 (gms) | Comp Ex. 10 (gms) |
| 2-butyl-1-octanol | C-12 | | 186.0 | | | | | | | | |
| 2-octyl-1-decanol | C-18 | | | 275.9 | | | | | | | |
| 2-octyl-1-dodecanol | C-20 | | | | 298.0 | | | | | | |
| 2-decyl-1-tetradecanol | C-24 | | | | | 354.0 | | | | | |
| Tetradecyl octadecanol | C-32 | | | | | | 470.0 | | | | |
| 4-decanol | C-10 | | | | | | | 158.3 | | | |
| 1-octyl decanol | C-18 | | | | | | | | 270.0 | | |
| 1-eicosanol | C-20 | | | | | | | | | 298.6 | |
| Decyltetra decanol | C-24 | | | | | | | | | | 365.2 |
| Desmodur N3300 | | 588.0 | 588.0 | 588.0 | 588.0 | 588.0 | 588.0 | 588.0 | 588.0 | 588.0 | 588.0 |
| dibutyl tin dilaurate | | 0.05 | 0.05 | 0.05 | 0.05 | 0.05 | 0.05 | 0.05 | 0.05 | 0.05 | 0.05 |
| 2-butyl-2-ethyl propane diol | | 480.0 | 320.0 | 320.0 | 320.0 | 320.0 | 320.0 | 320.0 | 320.0 | 320.0 | 320.0 |
| n-butyl acetate | | 457.7 | 468.9 | 507.4 | 516.9 | 540.9 | 590.6 | 457.0 | 504.9 | 517.1 | 545.7 |

TABLE 2

| Properties | No mono-functional alcohol Comp. Ex. 1 | Guerbet alcohol modified (branched) | | | | | Linear alcohol modified | | | | Acrylic Polyol Comp Ex. 11 |
|---|---|---|---|---|---|---|---|---|---|---|---|
| | | Ex. 2 | Ex. 3 | Ex. 4 | Ex.5 | Ex.6 | Comp Ex.7 | Comp Ex. 8 | Comp Ex. 9 | Comp Ex. 10 | |
| % Non-Volatile | 66.7 | 67 | 66.8 | 69.2 | 69.5 | 70.2 | 69.7 | 71.5 | 73.4 | 72.4 | 74.8 |
| Brookfield visc, cps 50 rpm, #4 spindle, 20° C. | 1420 | 1,160 | 704 | 928 | 728 | 604 | 1,460 | Wax | Wax | Wax | 6,450 |
| OH Number (mg KOH/g) | 157.6 | 102.6 | 94.8 | 93 | 88.9 | 81.4 | 105.3 | 95.2 | 93 | 88.2 | 130.8 |
| Mn | 2,519 | 1,868 | 2,752 | 2,098 | 2,167 | 2,311 | 1,598 | 2,102 | 2,140 | 2,257 | 3,250 |
| Mw | 4,836 | 3,070 | 3,835 | 3,214 | 3,213 | 3,269 | 2,108 | 3,163 | 3,190 | 4,190 | 9879 |
| polydispersity (Mw/Mn) | 1.9 | 1.6 | 1.4 | 1.5 | 1.5 | 1.4 | 1.3 | 1.5 | 1.5 | 1.9 | 2.8 |

TABLE 3

| Polyurethane polyol used in clear coat formulation | DFT (mil) | Mandrel bend at +22° C. | Reverse impact at −22° C. | Temp ° C. at first sign of acid etch | Severity of acid etch at 77° C. |
|---|---|---|---|---|---|
| Comp. Ex. 1 | 1.0 | Fail | Fail | 81 | No etch |
| Ex. 2 | 0.9 | Pass | Fail | 81 | No etch |
| Ex. 3 | 1.0 | Pass | Fail | 85 | No etch |
| Ex. 4 | 0.9 | Pass | Pass | 77 | Slight |
| Ex. 5 | 1.0 | Pass | Pass | 78 | Slight |
| Ex. 6 | 1.0 | Pass | Pass | 81 | No etch |
| Comp. Ex. 7 | 0.9 | Fail | Fail | 81 | No etch |
| Comp. Ex. 8 | 0.9 | Pass | Fail | 70 | Severe |

TABLE 3-continued

| Polyurethane polyol used in clear coat formulation | DFT (mil) | Mandrel bend at +22° C. | Reverse impact at −22° C. | Temp ° C. at first sign of acid etch | Severity of acid etch at 77° C. |
| --- | --- | --- | --- | --- | --- |
| Comp. Ex. 9 | Was not tested due to waxy consistency | | | | |
| Comp. Ex. 10 | Was not tested due to waxy consistency | | | | |
| Comp. Ex. 11 | 0.9 | Fail | Fail | 68 | Severe |

What is claimed is:

1. A polyurethane polyol composition comprising the reaction product of
   (a) a polyisocyanate,
   (b) a polyol, and
   (c) a Guerbet alcohol having at least 12 carbon atoms or a Guerbet alcohol mixture having an average of at least 12 carbon atoms.

2. A polyurethane polyol composition according to claim 1 wherein the Guerbet alcohol is a Guerbet alcohol having 16 to 32 carbon atoms or a Guebert alcohol mixture having an average of 16 to 32 carbon atoms.

3. A polyurethane polyol composition according to claim 2 wherein the Guerbet alcohol is selected from the group consisting of 2-hexyl-1-decanol, 2-octyl-1-decanol, 2-octyl-1-dodecanol, 2-hexyl-1-dodecanol, 2-decyl-1-tetradecanol, and mixtures thereof.

4. A polyurethane polyol composition according to claim 1 wherein the polyol is selected from the group consisting of α,β diols, α,γ diols, and mixtures thereof.

5. A polyurethane polyol composition according to claim 4 wherein the polyol is selected from the group consisting of 2-ethyl-1,3-hexane diol, 1,2,-hexane diol, 1,2-octane diol, 1,2-decane diol, 2,2,4-trimethyl-1,3-pentane diol, 2-butyl-2-ethyl-2,3-propane diol, and mixtures thereof.

6. A polyurethane polyol according to claim 1 wherein the polyisocyanate is the isocyanurate of hexamethylene diisocyanate.

7. A method of preparing a polyurethane polyol composition comprising reacting a polyisocyanate and a Guerbet alcohol having 12 to 32 carbon atoms to produce a prepolymer and reacting the prepolymer with a polyol to produce a polyurethane polyol composition.

8. A method of preparing a polyurethane polyol composition according to the method of claim 7 wherein the Guerbet alcohol is a Guerbet alcohol having 16 to 32 carbon atoms.

9. A method of preparing a polyurethane polyol composition according to the method of claim 8 wherein the Guerbet alcohol is selected from the group consisting of 2-hexyl-1-decanol, 2-octyl-1-decanol, 2-octyl-1-dodecanol, 2-hexyl-1-dodecanol, 2-decyl-1-tetradecanol, and mixtures thereof.

10. A method of preparing a polyurethane polyol composition according to the method of claim 7 wherein the polyol is selected from the group consisting of α,β diols, α,γ diols, and mixtures thereof.

11. A method of preparing a polyurethane polyol composition according to the method of claim 10 wherein the polyol is selected from the group consisting of 2-ethyl-1,3-hexane diol, 1,2-hexane diol, 1,2-octane diol, 1,2-decane diol, 2,2,4-trimethyl-1,3-pentane diol, 2-butyl-2-ethyl-2,3-propane diol, and mixtures thereof.

12. A method of preparing a polyurethane polyol composition according to the method of claim 7 wherein the polyisocyanate is the isocyanurate of hexamethylene diisocyanate.

13. A coating composition comprising a polyurethane polyol composition according to claim 1 and a crosslinker.

14. A coating composition comprising a polyurethane polyol composition according to claim 4 and a crosslinker.

15. A coating composition comprising a polyurethane polyol composition prepared according to the method of claim 7 and a crosslinker.

16. A coating composition according to claim 13 wherein the crosslinker is selected from the group consisting of polyisocyanates, blocked polyisocyanates, aminoplasts, melamine resins, and mixtures thereof.

17. A coating composition according to claim 14 wherein the crosslinker is selected from the group consisting of polyisocyanates, blocked polyisocyanates, aminoplasts, melamine resins, and mixtures thereof.

18. A flexible substrate coated with the coating composition of claim 13.

19. A flexible substrate coated with the coating composition of claim 14.

20. A flexible substrate coated with the coating composition of claim 15.

* * * * *